United States Patent
Kim et al.

(10) Patent No.: US 9,386,382 B2
(45) Date of Patent: Jul. 5, 2016

(54) HEARING AID COMPATIBLE MOBILE ELECTRONIC DEVICE

(71) Applicant: Samsung Electronics Co., Ltd., Suwon-si, Gyeonggi-do (KR)

(72) Inventors: Youngjong Kim, Anyang-si (KR); Byungseol Cho, Suwon-si (KR); Jaehyung Cho, Ansan-si (KR); Youngjae Kwon, Suwon-si (KR); Jaeyoung Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 14/305,464

(22) Filed: Jun. 16, 2014

(65) Prior Publication Data

US 2015/0003654 A1   Jan. 1, 2015

(30) Foreign Application Priority Data

Jun. 27, 2013  (KR) ........................ 10-2013-0074763

(51) Int. Cl.

| | |
|---|---|
| *H04B 15/00* | (2006.01) |
| *H04R 25/00* | (2006.01) |
| *H04B 1/04* | (2006.01) |
| *H04B 15/02* | (2006.01) |
| *H04B 15/04* | (2006.01) |
| *H04R 3/00* | (2006.01) |
| *H04B 1/3805* | (2015.01) |
| *H04M 1/725* | (2006.01) |

(52) U.S. Cl.
CPC ............ *H04R 25/554* (2013.01); *H04B 1/0475* (2013.01); *H04B 15/02* (2013.01); *H04B 15/04* (2013.01); *H04R 3/002* (2013.01); *H04B 1/3805* (2013.01); *H04M 1/72591* (2013.01); *H04R 2225/49* (2013.01)

(58) Field of Classification Search
USPC ......... 455/114.2, 550.1, 556.1; 381/312, 315, 381/317
See application file for complete search history.

(56) References Cited

U.S. PATENT DOCUMENTS

| | | | | |
|---|---|---|---|---|
| 7,343,181 | B2* | 3/2008 | Chan ..................... | H04M 1/035 379/52 |
| 7,551,942 | B2* | 6/2009 | Hawker ............ | H04M 1/72522 381/312 |
| 8,095,073 | B2* | 1/2012 | Hayes .................. | H04B 1/3838 381/312 |
| 8,923,528 | B2* | 12/2014 | Arche .................. | H04R 25/554 381/361 |
| 2005/0227665 | A1* | 10/2005 | Murray .................. | H04B 15/00 455/333 |
| 2006/0262951 | A1 | 11/2006 | Jun | |

OTHER PUBLICATIONS

Berger, Hearing Aid Compatibility With Wireless Communications Devices, IEEE 1997 International Symposium on Electromagnetic Compatibility. Aug. 18-22, 2007, p. 123-128, New York, NY.

* cited by examiner

*Primary Examiner* — Blane J Jackson
(74) *Attorney, Agent, or Firm* — Jefferson IP Law, LLP (57) ABSTRACT

A hearing aid compatible mobile electronic device is provided. The hearing aid compatible mobile electronic device includes a wireless communication unit including a power amplification module, a power source configured to transfer a first current to the power amplification module through a sending end thereof and to receive a second current from the power amplification module through a ground terminal thereof, a line unit connected between the power amplification module and the power source and including a first line through which the first current flows and a second line through which the second current flows in an opposite direction to the first current, and a receiver configured to generate a magnetic signal for hearing aid compatibility and to receive a first magnetic field generated by the first current and a second magnetic field generated by the second current.

12 Claims, 7 Drawing Sheets

| DIVISION | PHYSICAL FACTOR | Case1 | Case2 | Case3 | Case4 | Case5 | Case6 |
|---|---|---|---|---|---|---|---|
| CONDITION | $\delta$ <mm> | 40.00 | 20.00 | 1.00 | 0.10 | 0.10 | 0.10 |
| | $\Delta$ <mm> | 7.00 | 7.00 | 7.00 | 7.00 | 3.00 | 3.00 |
| | SEPARATION DISTANCE ON Y-AXIS BETWEEN RECEIVER AND FIRST LINE $\rho$<mm> | 45.00 | 45.00 | 45.00 | 45.00 | 45.00 | 85.00 |
| HARMONIC CURRENT | I <A> | 2.000 | 2.000 | 2.000 | 2.000 | 2.000 | 2.000 |
| | T <msec> | 4.615 | 4.615 | 4.615 | 4.615 | 4.615 | 4.615 |
| | $\tau$ <usec> | 577.00 | 577.00 | 577.00 | 577.00 | 577.00 | 577.00 |
| | $\tau\_r, \tau\_f$ <usec> | 0.000 | 0.000 | 0.000 | 0.000 | 0.000 | 0.000 |
| | 15th <mA> | 235.22 | 235.22 | 235.22 | 235.22 | 235.22 | 235.22 |
| MAGNETIC FIELD BY FIRST LINE | SEPARATION DISTANCE ON Z-AXIS BETWEEN RECEIVER AND FIRST LINE <mm> | 30.00 | 30.00 | 30.00 | 30.00 | 30.00 | 30.00 |
| | LENGTH OF FIRST LINE<mm> | 35.00 | 35.00 | 35.00 | 35.00 | 35.00 | 35.00 |
| | DISTANCE BETWEEN RECEIVER AND FIRST LINE<mm> | 54.08 | 54.08 | 54.08 | 54.08 | 54.08 | 90.14 |
| | $\sin \alpha 1$ | -0.31 | -0.31 | -0.31 | -0.31 | -0.31 | -0.19 |
| | $\sin \alpha 2$ | 0.31 | 0.31 | 0.31 | 0.31 | 0.31 | 0.19 |
| | $H_{total}$<A/m> | 0.213 | 0.213 | 0.213 | 0.213 | 0.213 | 0.079 |
| | $20\log(H_{total})$<dBA/m> | -13.43 | -13.43 | -13.43 | -13.43 | -13.43 | -22.03 |
| | Hy<A/m> | 0.118 | 0.118 | 0.118 | 0.118 | 0.118 | 0.026 |
| | Hz<A/m> | 0.177 | 0.177 | 0.177 | 0.177 | 0.177 | 0.075 |
| MAGNETIC FIELD BY SECOND LINE | SEPARATION DISTANCE ON Z-AXIS BETWEEN RECEIVER AND SECOND LINE<mm> | 30.00 | 30.00 | 30.00 | 30.10 | 30.10 | 30.10 |
| | LENGTH OF SECOND LINE<mm> | 28.00 | 28.00 | 28.00 | 28.00 | 32.00 | 32.00 |
| | DISTANCE BETWEEN RECEIVER AND SECOND LINE<mm> | 90.14 | 71.59 | 54.92 | 54.14 | 54.14 | 90.17 |
| | $\sin \alpha 1$ | -0.15 | -0.19 | -0.25 | -0.25 | -0.28 | -0.17 |
| | $\sin \alpha 2$ | 0.15 | 0.19 | 0.25 | 0.25 | 0.28 | 0.17 |
| | $H_{total}$ <A/m> | -0.064 | -0.100 | -0.168 | -0.173 | -0.196 | -0.073 |
| | $20\log(H_{total})$<dBA/m> | -23.91 | -19.97 | -15.47 | -15.23 | -14.16 | -22.79 |
| | Hy<A/m> | -0.021 | -0.042 | -0.092 | -0.096 | -0.109 | -0.024 |
| | Hz<A/m> | -0.060 | -0.091 | -0.141 | -0.144 | -0.163 | -0.068 |
| PREDICTED SIMULATION RESULT | $20\log(H\_Total)$<dBA/m> | -16.52 | -18.96 | -26.99 | -27.96 | -35.33 | -43.58 |
| | $20\log(Hy\_Total)$<dBA/m> | -20.27 | -22.37 | -31.63 | -33.17 | -40.68 | -53.42 |
| | $20\log(Hz\_Total)$<dBA/m> | -18.62 | -21.29 | -28.81 | -29.52 | -36.83 | -44.06 |

| H-Field | CONDITION | MAGNETIC SIGNAL | NOISE | SNR |
|---|---|---|---|---|
| Hy<dBA/m> | HAC RECEIVER | 9.16 | -19.12 | 28.28 |
| | GENERAL RECEIVER | -2.86 | -31.74 | 28.88 |
| Hz<dBA/m> | HAC RECEIVER | 16.96 | -23.25 | 40.21 |
| | GENERAL RECEIVER | 5.45 | -26.30 | 31.75 |

HEARING AID COMPATIBLE MOBILE ELECTRONIC DEVICE

CROSS-REFERENCE TO RELATED APPLICATION(S)

This application claims the benefit under 35 U.S.C. §119 (a) of a Korean patent application filed on Jun. 27, 2013 in the Korean Intellectual Property Office and assigned Serial number 10-2013-0074763, the entire disclosure of which is hereby incorporated by reference.

TECHNICAL FIELD

The present disclosure relates to a hearing aid compatible mobile electronic device. More particularly, the present disclosure relates to a hearing aid compatible mobile electronic device which reduces noise through a change of line design, thereby supporting compliance with the Hearing Aid Compatibility (HAC) regulation.

BACKGROUND

Mobile electronic devices continue to be increasingly used due to their portability and ability to support particular user functions. Accordingly, the rate of hearing impairment caused by mobile devices has increased on account of an electromagnetic wave generated by the mobile electronic devices. Surveys show that ten percent of the American population has a hearing problem, eighty percent of them have been using a hearing aid, and about 500 million people have hearing difficulties worldwide.

In order to increase access to the use of mobile electronic devices for those with hearing problems, in July 2003 the Federal Communication Committee (FCC) adopted a regulation demanding that wireless device manufacturers and enterprises provide terminals compatible with hearing aids to consumers. Accordingly, half of mobile phone models sold in USA should be authenticated for Hearing Aid Compatibility (HAC) from the year 2008.

The HAC regulations include items, such as an intensity of a magnetic signal, a Signal to Noise Ratio (SNR), and a frequency response. The mobile electronic devices may be acknowledged as a HAC mobile electronic device when satisfying the required conditions. More particularly, the mobile electronic devices are divided into T1 to T4 ratings according to the intensity of the magnetic signal and the SNR among the items, and may be acknowledged as the HAC mobile electronic device when receiving a T3 or T4 rating. More specifically, a magnetic signal intensity of −18 dBA/m or more and an SNR of 20 dB are required to receive a T3 or higher rating according to the HAC regulation. Here, the SNR is defined as a magnetic signal to noise ratio in a band of 1 kHz.

Meanwhile, HAC mobile electronic devices generally use a receiver further including a tele-coil, namely, a receiver referred to as a HAC receiver. Since the HAC receiver further includes the tele-coil, the HAC receiver has an advantage in terms of amplifying the intensity of the magnetic signal but is inferior in other capabilities. Namely, comparing the HAC receiver with a receiver that does not include the tele-coil (hereinafter, referred to as a 'general receiver'), the HAC receiver has an audio volume of about 10 dB lower than the general receiver, and an additional coil should be embedded in the receiver so that the size of the receiver itself is increased and manufacturing costs increase as well.

Therefore, a need exists for a hearing aid compatible mobile electronic device which reduces noise through a change of line design, thereby supporting compliance with the HAC regulation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hearing aid compatible mobile electronic device which can reduce noise through a change of line design without using a Hearing Aid Compatibility (HAC) receiver to improve a Signal to Noise Ratio (SNR), thereby supporting compliance with the HAC rule.

In accordance with an aspect of the present disclosure, a hearing aid compatible mobile electronic device is provided. The electronic device includes a wireless communication unit including a power amplification module, a power source configured to transfer a first current to the power amplification module through a sending end thereof and to receive a second current from the power amplification module through a ground terminal thereof, a line unit connected between the power amplification module and the power source and including a first line through which the first current flows and a second line through which the second current flows in an opposite direction to the first current, and a receiver configured to generate a magnetic signal for hearing aid compatibility and to receive a first magnetic field generated by the first current and a second magnetic field generated by the second current.

As described above, the present disclosure provides a hearing aid compatible mobile electronic device which can reduce noise through the change of the line design to improve the SNR, thereby providing excellent usability.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4 and 5 illustrate simulation results according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A mobile electronic device according to an embodiment of the present disclosure includes a Personal Digital Assistant (PDA), a smart phone, an International Mobile Telecommunication 2000 (IMT-2000) terminal, a Universal Mobile Telecommunication System (UMTS) terminal, and the like as well as a mobile telecommunication electronic device, and they are characterized by using Time Division Multiple Access (TDMA) scheme.

Figure 1:
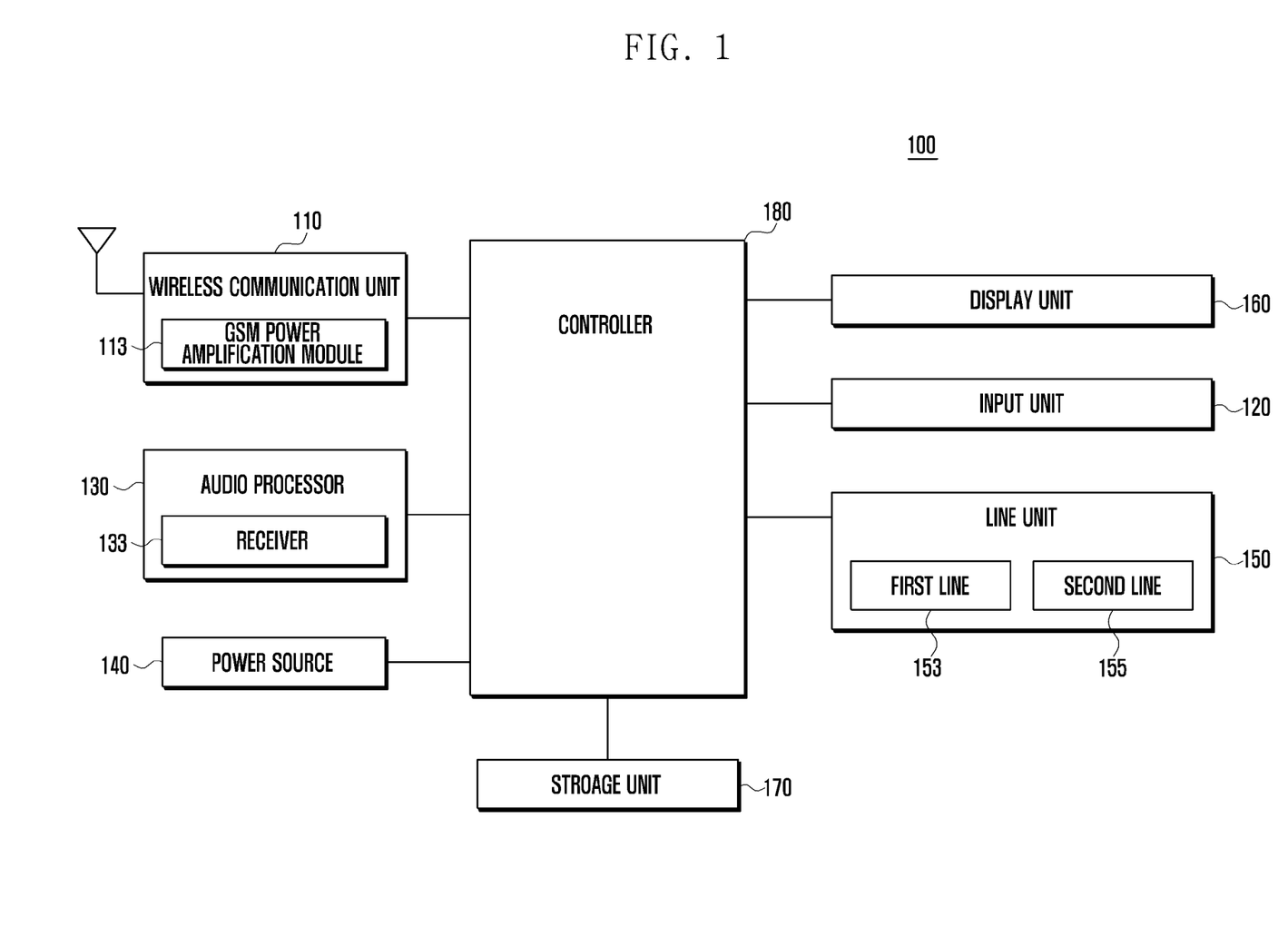
FIG. 1 is a block diagram illustrating a configuration of a mobile electronic device according to an embodiment of the present disclosure.

FIG. 1 is a block diagram illustrating a configuration of a mobile electronic device according to an embodiment of the present disclosure.

Referring to FIG. 1, a mobile electronic device 100 may include a wireless communication unit 110, an input unit 120, an audio processor 130, a power source 140, a line unit 150, a display unit 160, a storage unit 170, and a controller 180.

The wireless communication unit 110 may be a configuration for performing a function of transmitting/receiving corresponding data for wireless communication of the mobile electronic device 100. The wireless communication unit 110 may be configured with a Radio Frequency (RF) transmitter that up-converts and amplifies a frequency of a transmitted signal, and an RF receiver that low-noise amplifies a received signal and down-converts a frequency of the received signal. Further, the wireless communication unit 110 may receive data through a wireless channel to output the received data to the controller 180, and may transmit data output from the controller 180 through the wireless channel.

The wireless communication unit 110 may include a Global System for Mobile Communication (GSM) power amplification module 113. The GSM power amplification module 113 may be a configuration for amplifying the power of a signal for communication. The GSM uses the TDMA modulation scheme for communication, and TDMA noise is generated by the TDMA modulation scheme. A change of line design of the mobile electronic device 100 for reduction of the noise will be described below with reference to FIG. 2. Meanwhile, the technical spirit is not limited to the GSM power amplification module 113, and any power amplification module capable of generating noise may be included therein in addition to the GSM power amplification module 113.

The input unit 120 may be a configuration for receiving a user key manipulation signal for controlling the mobile electronic device 100. The input unit 120 may be configured as a keypad, such as a 3*4 keyboard or a Qwerty keyboard, including number keys, character keys, and direction keys, and may also be configured as a touch panel. The mobile electronic device 100 may further include a button key, a jog key, and a wheel key in addition to the keypad or the touch panel. The input unit 120 may generate an input signal for execution of a function of the mobile electronic device 100 (i.e., a call function, a video or music reproduction function, an image display function, a photography function, or the like) according to a user input, and may transfer the generated input signal to the controller 180.

The audio processor 130 may include a codec, and the codec may be configured with data codec for processing packet data and an audio codec for processing an audio signal, such as a voice. The audio processor 130 may convert an analog audio signal input from a Microphone (MIC) into a digital audio signal through the audio codec, convert the digital audio signal into an analog audio signal through the audio codec, and output the converted analog audio signal through a telephone receiver 133 or a Speaker (SPK). The telephone receiver 133 is hereinafter referred to as "receiver 133."

The receiver 133 may convert an electrical voice signal into a voice, and may generate a magnetic signal for hearing aid compatibility. When an electrical signal having several frequencies is applied to a voice coil included in the receiver 133, a vibration plate is vibrated according to a change in a magnetic signal and a polarity of the voice coil depending on the intensity and the frequencies of the applied electrical signal thereby generating sound pressure which a person is able to recognize. The receiver 133 may be a general receiver 133 that does not include a tele-coil. For acquisition of a Signal to Noise Ratio (SNR) of that corresponds to at least a T3 rating within the Hearing Aid Compatibility (HAC) regulations, a method for reducing noise may be considered in addition to a method for amplifying intensity of a signal transferred to a hearing aid. Accordingly, if the SNR may be improved through noise reduction without the HAC receiver 133, an SNR that corresponds to a T3 rating or higher according to the HAC regulations can be acquired though the general receiver 133 is used. Therefore, even though the mobile electronic device 100 includes the general receiver 133, the mobile electronic device 100 will still be in compliance with the HAC regulations. Conversely, objects of the present disclosure can still be achieved even though the mobile electronic device 100 includes a HAC receiver 133 instead of a general receiver 133.

The power source 140 may include a battery and corresponds to a configuration for supplying each configuration of the mobile electronic device 100 with power. In the embodiment of the present disclosure, power may be supplied to the GSM power amplification module 113 through the line unit 150 connected with a sending end of the power source 140, and a current may be received from the GSM power amplification module 113 through a ground terminal of the power source 140.

The line unit 150 may correspond to a configuration for transferring a current between the power source 140 and the GSM power amplification module 113. The line unit 150 may be configured with a first line 153 and a second line 155. The first line 153 may correspond to a line for transferring a current from the battery to the GSM power amplification module 113, and the second line 155 may correspond to a configuration for transferring a current from the GSM power amplification module 113 to the ground terminal of a battery contact end. A magnetic field may be formed by a current flowing from the power source 140 to the GSM power amplification module 113 through the first line 153, and the magnetic field formed as described above refers to noise received by the receiver 133. Accordingly, the noise may be used along with the magnetic field formed by the first line 153 in the following description. In the embodiment of the present disclosure, a current is allowed to flow from the GSM power amplification module 113 to the ground terminal of the contact end of the power source 140, thereby removing the noise generated by the first line 153. The GSM power amplification module 113 of the related art has been designed such that a current flows from the GSM power amplification module 113 to the ground terminal within the GSM power amplification module 113. Meanwhile, in the embodiment of the present disclosure, design of the second line 155 may be changed such that a current flows from the GSM power amplification module 113 to the ground terminal of the power source. Accordingly, the noise generated by the first line 153 may be removed through the design change of the second line 155 which is parallel to the first line 153 and through which a current flows in an opposite direction to that of the current flowing through the first line 153.

The display unit 160 may be formed of a Liquid Crystal Display (LCD), an Organic Light Emitting Diodes (OLED), an Active Matrix Organic Light Emitting Diode (AMOLED), or the like, and may visually provide a user with menus, input data, function setting information, and other various pieces of information of the mobile electronic device 100. The display unit 160 may output a boot-up screen, a standby screen, a menu screen, a call screen, and other application screens of the mobile electronic device 100.

The storage unit 170 may serve to store programs and data used for an operation of the mobile electronic device 100, and may be divided into a program area and a data area. The storage unit 170 may be configured with a volatile storage medium or a nonvolatile storage medium, and may also be configured with a combination of the aforementioned storage mediums. The volatile storage medium may include a semiconductor memory, such as a Random Access Memory (RAM), a Dynamic Random Access Memory (DRAM), and a Static Random Access Memory (SRAM), and the nonvolatile storage medium may include a hard disk.

The controller 180 may control an overall operation of the mobile electronic device 100 and a signal flow between internal blocks of the mobile electronic device 100. More particularly, the controller 180 may control the receiver 133 such that a magnetic signal may be transferred to an induction coil within a user's hearing aid. Hereinafter, a method for removing noise will be described based on the GSM power amplification module 113, the receiver 133, the power source 140, and the line unit 150.

Figure 2:
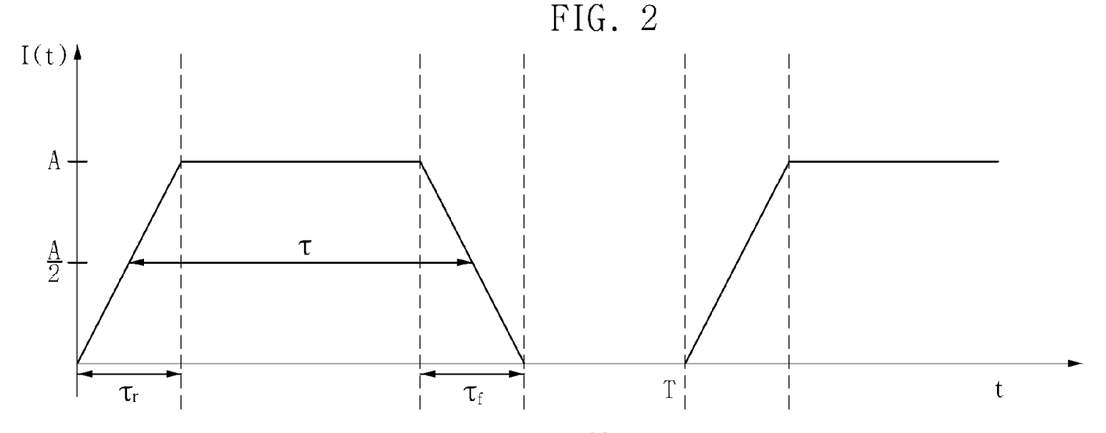
FIG. 2 is a view for modeling noise received by a receiver according to an embodiment of the present disclosure.

FIG. 2 is a view for modeling noise received by a receiver according to an embodiment of the present disclosure.

Referring to FIG. 2, <201> illustrates a current flowing in the first line 153 between the power source 140 and the GSM power amplification module 113 by using an Asymmetric Pulse Modeling technique, and <203> of FIG. 2 illustrates a process of calculating noise received by the receiver 133 based on a magnitude of a current calculated from the current illustrated in <201> of FIG. 2.

Prior to a description of FIG. 2, the method for which the mobile electronic device 100 may acquire an SNR corresponding to a T3 rating or higher according to the HAC regulation by reducing the noise received by the receiver 133 will be described. The main reason for the noise lies in the GSM communication scheme, namely, the TDMA modulation scheme. In the TDMA modulation scheme, one frame is formed of eight time slots, and data transmission/reception is repeated over a period T of about 4.615 ms with repetition of data reception, in which 4.615 ms corresponds to 217 Hz frequency. The maximum power generated by the TDMA modulation scheme is 33 dBm, and this corresponds to a high power of 2 W. A configuration for amplifying such a high power is the GSM power amplification module 113. A current of up to 2 A (Ampere) may flow from the power source 140 to the GSM power amplification module 113 through the first line 153 over a period (217 Hz) at which data transmission/reception is repeated when the GSM power amplification module 130 outputs maximum power. At this time, noise, namely a strong magnetic field, is generated by the current flowing through the first line 153. The magnetic field is generated by Ampere's law in a direction of wrapping a right hand around the first line 153 through which the current flows.

Asymmetric Pulse Modeling for the current flowing through the first line 153 illustrated in <201> of FIG. 2 may be defined by Equation 1.

$$Inth = 2*A*(\tau/T)*|\sin(n\pi\tau/T)/(n\pi\tau/T)|*|\sin(n\pi\tau r/T)/(n\pi\tau r/T)|$$ Equation 1

Here, an SNR for a determination of a T rating is defined as a signal to noise ratio in a band of 1 kHz, and since 1 kHz is five times as large as the period (217 Hz) at which the data transmission/reception is repeated in the TDMA modulation scheme, Inth may be regarded as a fifth-order harmonic current. Namely, it may be determined in Equation 1 that n is equal to 5. Moreover, a maximum current A may be 2 (A), a period T may be 4.615 ms, a time period τ corresponding to a bandwidth may be 577 μs, and a rise time (τr) and a fall time (τf) may be 0s. The current flowing through the first line 153 may be calculated as 235.2 mA if the values listed above are used.

<203> of FIG. 2 represents a magnetic field model for calculating a magnetic field, namely, noise, which is generated by the current flowing through the first line 153 connecting the power source 140 and the GSM power amplification module 113 and is received by the receiver 133. In <203> of FIG. 2, the magnetic field is a in vertical direction toward a paper plane of FIG. 2, namely, a direction perpendicular to that of the current flowing through the first line 153 according to Ampere's law, and is perpendicular to a direction of a vector of which starting point corresponds to a location of a line current flowing through the first line 153 and of which the ending point corresponds to a location of the receiver 133. Here, when a length of a vertical line from the receiver 133 to the first line 153 is defined as ρ and angles α1 and α2 are defined as illustrated in <203> of FIG. 2, Equation 3 may be obtained by using Maxwell's equation (Equation 2) and Gauss's law.

$$\oint \vec{H} \cdot \vec{dl} = \int \vec{J} \cdot \vec{ds} \qquad \text{Equation 2}$$

$$\vec{H} = I^*(\sin \alpha 2 - \sin \alpha 1)/(4^*\pi^*\rho) \qquad \text{Equation 3}$$

It can be seen from Equation 3 that the magnetic field, namely, the noise received by the receiver 133 is a function of the current I flowing through the first line 153, the angles α1 and α2, the length ρ of the vertical line. In the embodiment of the present disclosure, line design of the second line 155 through which a current flows from the GSM power amplification module 113 to the power source 140 may be changed in order to reduce (or offset) the noise generated by the current flowing through the first line 153. Hereinafter, the second line 155 for reducing the noise received by the receiver 133 will be described.

Figure 3:
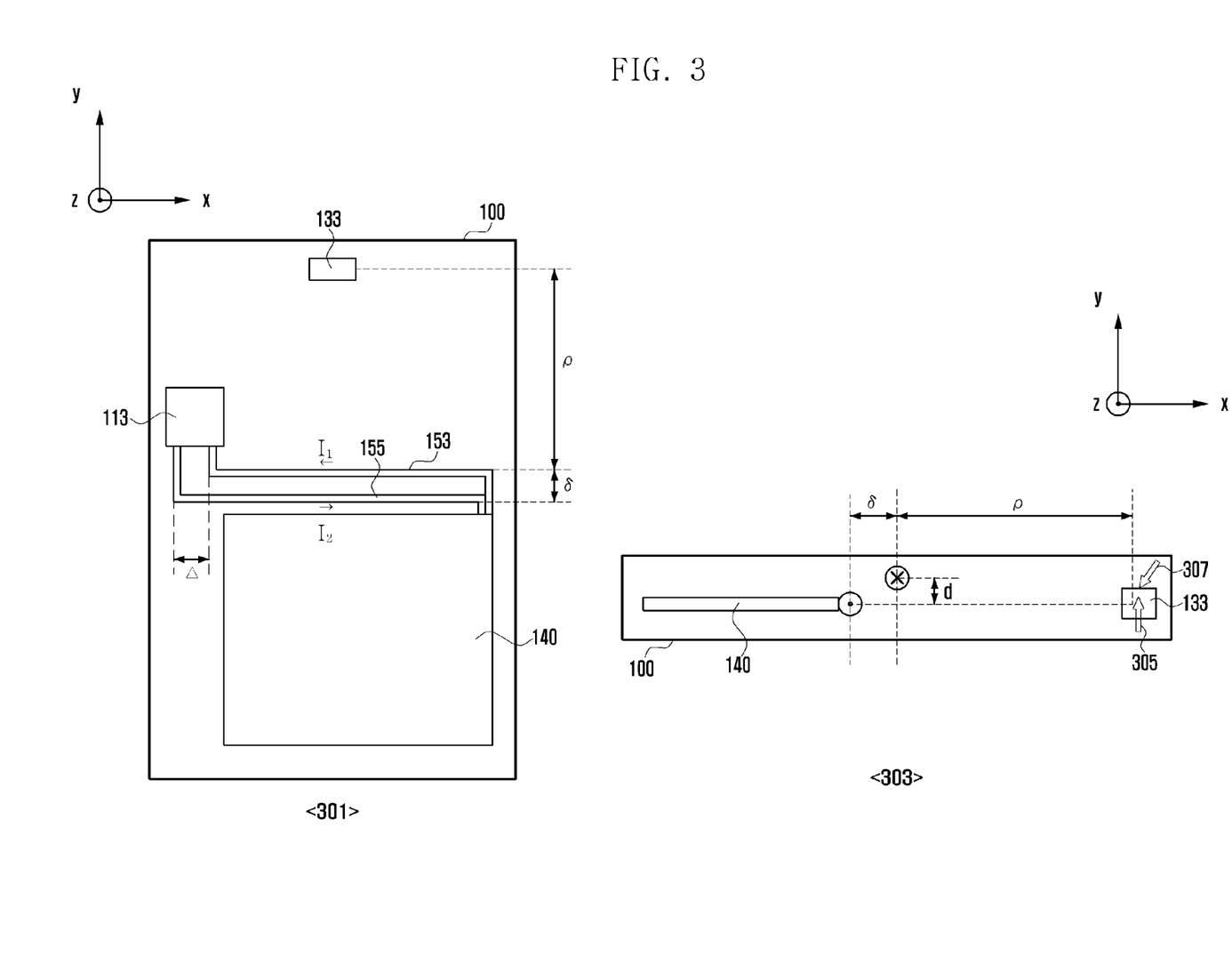
FIG. 3 illustrates a rear view and a side view of a mobile electronic device for reducing noise received by a receiver according to an embodiment of the present disclosure.

FIG. 3 illustrates a rear view and a side view of a mobile electronic device for reducing noise received by a receiver according to an embodiment of the present disclosure.

Referring to FIG. 3, a second line 155 may be designed to be in parallel with a first line 153. The second line 155 may be designed to be in parallel with the first line 153 as illustrated in <301> of FIG. 3 in order to reduce a magnetic field generated by the first line 153, in which case the second line 155 may be connected not to a ground terminal within a GSM power amplification module 113 but to a ground terminal of a contact end of a power source 140. Accordingly, the second line 155 may be designed such that a current flows from the GSM power amplification module 113 to the ground terminal of the power source 140 through the second line 155 in an opposite direction to a current in the first line 153. At this time, in a case where a current flows from the GSM power amplification module 113 to another line other than the first and second lines 153 and 155, a magnetic field may be generated by the other line. To address this issue, the first and second lines 153 and 155 of the power source 140 may be configured to be independent of the GSM power amplification module 113 and the power source 140, and the GSM power amplification module 113 may be designed so as not to be connected with another ground terminal other than the ground terminal of the power source 140. Furthermore, although the first line 153 is disposed above the second line 155 in <301> of FIG. 3, the technical spirit of the present disclosure is not limited thereto and the second line 155 may also be disposed below the first line 153.

As illustrated in <301> of FIG. 3, a distance between a receiver 133 and the first line 153 may be defined as ρ, a distance between the first line 153 and the second line 155 may be defined as δ, and a length difference of the first line 153 and the second line 155 may be defined as Δ. An intensity of a magnetic field received by the receiver 133 may be determined by the distance ρ between the receiver 133 and the first line 153, the distance δ between the first line 153 and the second line 155, the length difference Δ of the first line 153 and the second line 155, a current I1 flowing through the first line 153, and a current I2 flowing through the second line 155, in Equation 3. Furthermore, as illustrated in <303> of FIG. 3, a height difference (d) between the first line 153 and the second line 155 may also exert an influence on the intensity of the magnetic field received by the receiver 133. Hereinafter, based on Equation 3, descriptions will be given of factors exerting an influence on the magnetic field received by the receiver, and a design change of the lines 153 and 155 and a current control for reduction of a magnetic field generated depending on the factors.

First, an influence of the height difference (d) between the first line 153 and the second line 155 on the magnetic field received by the receiver 133 will be described. It is assumed in <301> of FIG. 3 that a Z-axis is perpendicular to a paper plane of FIG. 3 and a positive (+) direction of the Z-axis corresponds to a direction away from the paper plane of FIG. 3 in a three dimensional coordinate system. In a case in which the first and second lines 153 and 155 are at the same height from the paper plane of FIG. 3, a magnetic field that is generated by the current I1 flowing in the first line 153 and the current I2 flowing in the second line 155 and is received by the receiver 133 may exist in a direction of the positive Z-axis and in a direction of ⊙. On the other hand, if there is a height difference (d) between the first line 153 and the second line 155, a magnetic field may also be generated in a direction of a Y-axis by the current I1 and the current I2. For example, in <303> of FIG. 3, a magnetic field generated by the current I2 flowing through the second line 155 is formed in the direction of the positive Z-axis as indicated by an arrow 305 since the second line 155 and the receiver 133 are at the same height from the paper plane of FIG. 3. On the other hand, a magnetic field generated by the current I1 flowing through the first line 153 may also be formed in a direction of a negative Z-axis and in a direction of a negative Y-axis as indicated by an arrow 307. Meanwhile, in the case in which the receiver 133, the first line 153, and the second line 155 are arranged as illustrated in <301> and <303> of FIG. 3, a magnetic field is not formed in a direction of an X-axis according to Ampere's law. Accordingly, in order to reduce the magnetic field received by the receiver 133, it is desirable to dispose the first line 153 and the second line 155 at the same height from the paper plane of FIG. 3. Namely, it is desirable to design the lines 153 and 155 such that the height difference (D) thereof becomes zero. However, the technical spirit is not limited thereto, and as will be described below, the horizontal distance interval δ between the first line 153 and the second line 155 may be made narrower, and the first line 153 and the second line 155 may also be disposed at different heights from the paper plane of FIG. 3 when there is a limitation in a space above a Printed Circuit Board (PCB).

Second, an influence of the separation distance difference (δ) between the first line 153 and the second line 155 on the magnetic field received by the receiver 133 will be described. From Equation 3, an intensity of the magnetic field generated by the current I1 flowing in the first line 153 corresponds to I1*(sin α2−sin α1)/(4*π*ρ), an intensity of the magnetic field generated by the current I2 flowing in the second line 155 corresponds to I2*(sin α2−sin α1)/(4*π*(ρ+δ)), and directions of the magnetic fields correspond to the direction of the positive Z-axis and the direction of ⊙, respectively. Thus, if I1 is identical with I2, and angle α1 and α2 for the first line 153 are identical with the angle α1 and α2 for second line 155 in FIG. 3, a difference of the magnetic fields is caused by δ, that is, the distance between the first line 153 and the second line 155. Accordingly, in order to reduce the intensity of the magnetic field received by the receiver 133, the first and second lines 153 and 155 may be designed such that the distance δ therebetween becomes zero, namely, the first and the second lines 153 and 155 are as close as possible.

Third, an influence of the length difference (Δ) between the first line 153 and the second line 155 on the magnetic field received by the receiver 133 will be described. If Δ is increased, that indicates that −α1 is maintained and α2 is increased in Equation 3. Since an intensity of a magnetic field is increased if Δ is increased, the first and second lines 153 and 155 may be designed such that Δ approaches zero, namely, the first and second lines 153 and 155 have the same length.

Meanwhile, an influence of the angles α1 and α2 on the magnetic field received by the receiver 133 may be identical with that of Δ, and thus, a detailed description thereof will be omitted.

Fourth, an influence of the distances between the receiver 133 and the first and second lines 153 and 155 on the magnetic field received by the receiver 133 will be described. Since the intensity of the magnetic field is decreased with an increase in the distances from the lines 153 and 155 to the receiver 133, it can be seen from Equation 3 that the intensity of the magnetic field received by the receiver 133 is decreased as the first and second lines 153 and 155 are further separated from the receiver 133. For example, as ρ or δ is increased in <301> of FIG. 3, the intensity of the magnetic field received by the receiver 133 may be decreased. Accordingly, in the embodiment of the present disclosure, it is desirable to design the lines 153 and 155 such that the distances between the receiver 133 and the lines 153 and 155 are maximized.

Fifth, an influence of a difference between the current I1 and the current I2 on the intensity of the magnetic field received by the receiver 133 will be described. From Equation 3, when other conditions are equal, it is desirable to design the first and second lines 153 and 155 such that the current I2 flowing through the second line 155 has the same magnitude as that of the current I1 flowing through the first line 153. However, it is difficult to physically design other conditions to be identical, except for the currents flowing through the lines 153 and 155. Accordingly, in the embodiment of the present disclosure, the controller 180 may control the currents I1 and I2 flowing in the lines 153 and 155, thereby reducing the intensity of the magnetic field received by the receiver 133 even when other conditions are somewhat different. A certain amount of current I1 used for power amplification may flow from the power source 140 to the GSM power amplification module 113. Thus, the controller 180 may control a magnitude, a phase, and a period of the current I2 while the current I1 is constant, thereby reducing the intensity of the magnetic field, namely, the intensity of the total magnetic field that is generated by the currents I1 and I2 and is received by the receiver 133.

Furthermore, a current adjustment unit (not illustrated) for distributing a current between the GSM power amplification module 113 and the second line 155 may be further included as an additional configuration for controlling the current I2. When the current I2 flowing in the second line 155 is greater than the current I1 flowing in the first line 153, the current adjustment unit may allow some of the current I2 to flow into the ground terminal within the GSM power amplification module 113, thereby controlling the current I2. Here, the current adjustment unit may be configured with at least one passive element, such as a resistor, an inductor, and a capacitor, or at least one semiconductor device, such as a Metal Oxide Semiconductor (MOS), a Bipolar Junction Transistor (BJT) and a diode, for controlling the current I2, but is not limited thereto. For example, the current adjustment unit may include at least one of a current distributor, a buck circuit, and a boost circuit. The current I2 flowing into the second line 155 may be adjusted through the current distributor, or the magnitude of the current I2 may be adjusted by controlling an output voltage of the GSM power amplification module 113 through addition of a voltage control circuit, such as a buck circuit and a boost circuit.

As described above, in the embodiment of the present disclosure, the first and second lines 153 and 155 may be designed to be located at the same height from the paper plane of FIG. 3 and close to each other, in order to reduce the intensity of the magnetic field received by the receiver. Furthermore, the first and second lines 153 and 155 may be designed to have the same length and to be far away from the receiver 133. In addition, the current I2 flowing in the second line 155 may be adjusted under the control of the controller 180.

Figure 5:
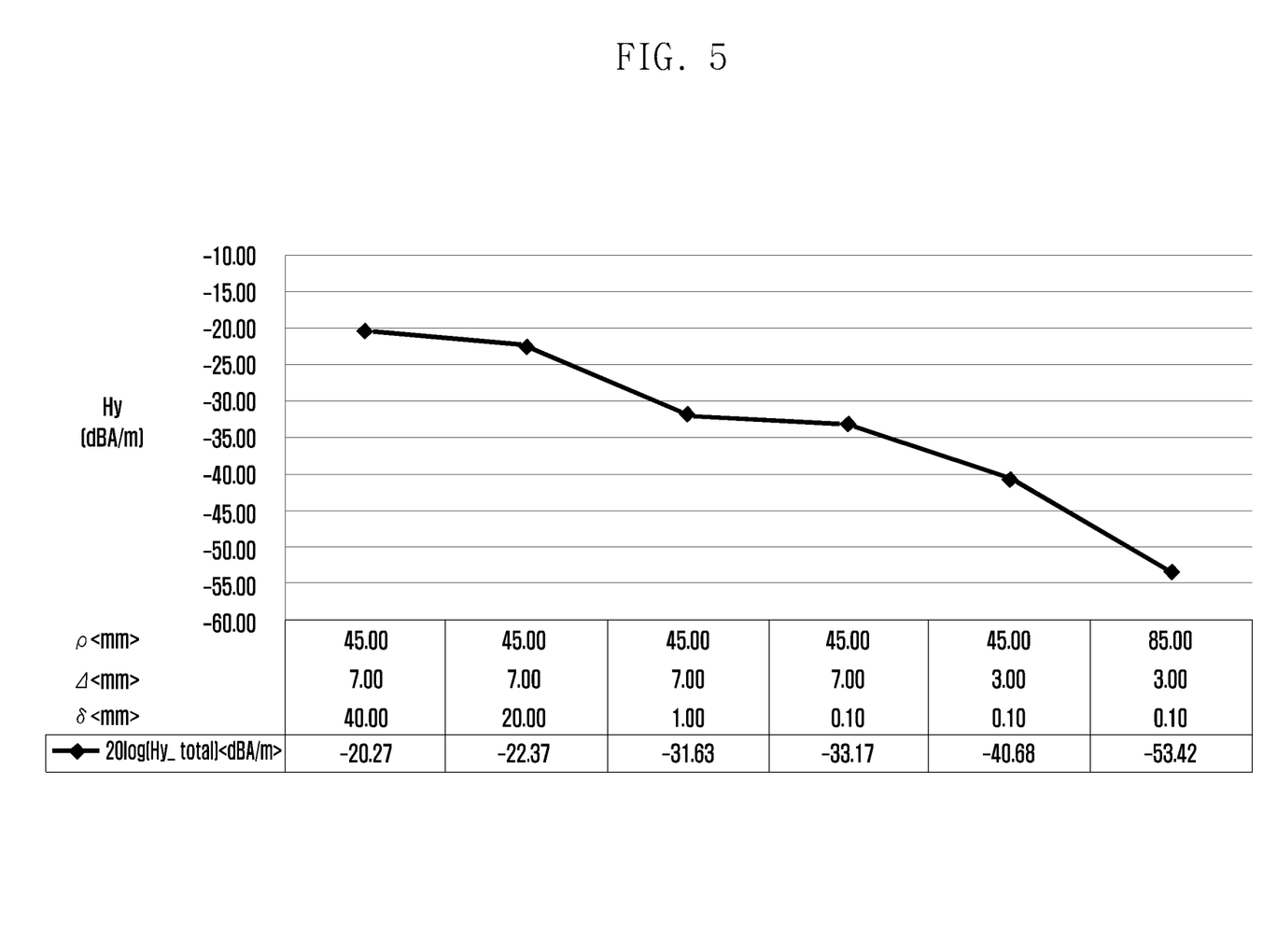

FIGS. 4 and 5 illustrate simulation results according to an embodiment of the present disclosure.

Referring to FIGS. 4 and 5, an improvement of the magnetic field received by the receiver 133 may be determined by a Y-axis component of the entire magnetic field received by the receiver 133 rather than the intensity thereof. Namely, the magnetic field intensity of the Y-axis direction may exert an important influence on the determination of a Signal to Noise Ratio (SNR) which corresponds to the HAC regulations. The voice coil included in the receiver 133 may be spirally wound around a Z-axis, and therefore, a magnetic signal generated by the receiver 133 may have a large Z-axis component and a minute Y-axis component. Accordingly, a component for determining the noise as an element of the SNR in addition to the magnetic signal may be the Y-axis component of the magnetic field generated by the current flowing in the first and second lines 153 and 155. Meanwhile, when the structure of the voice coil is changed, a direction of the component determining the noise may vary.

It may be identified that, when the distance δ between the first line 153 and the second line 155 is changed from 40 mm to 1 mm based on the configuration of the mobile electronic device 100 of FIG. 3, the intensity of the Y-axis component of the magnetic field is improved by 11 dB, and when the distance δ between the first line 153 and the second line 155 is changed from 7 mm to 3 mm, the intensity of the Y-axis component of the magnetic field is improved by 7 dB. Furthermore, it may be identified that when the first line 153 is further spaced a distance of 40 mm apart from the receiver 133, the intensity of the Y-axis component of the magnetic field is improved by about 12 dB.

FIG. 5 is a graph briefly illustrating the simulation result of FIG. 4. The graph illustrated in FIG. 5 represents the factors exerting, through Equations 1 to 3, an influence on the intensity of the magnetic field received by the receiver 133, and the results according to the design change for reducing the intensity of the magnetic field. For example, when the distance ρ between the receiver 133 and the first line 153 is increased and the length difference Δ and the distance δ between the first and second lines 153 and 155 are decreased, the intensity of the magnetic field received by the receiver 133 may be reduced.

Figure 6:
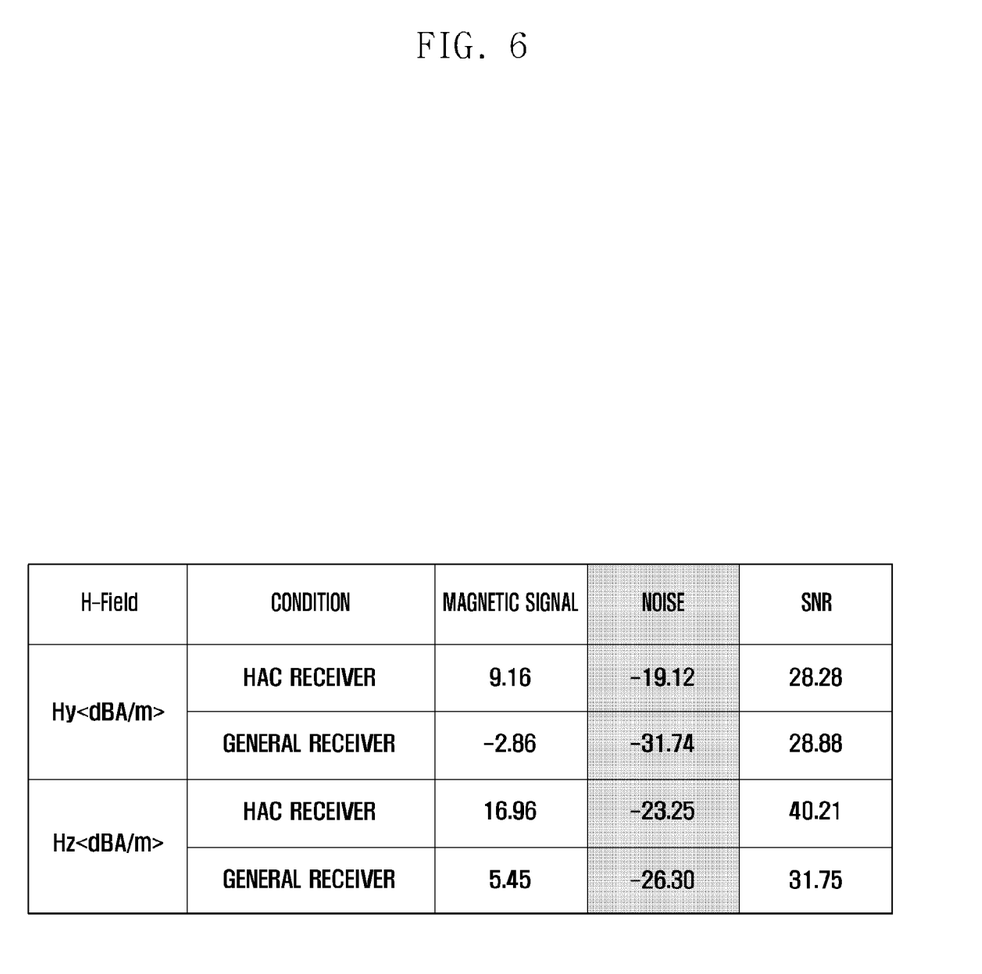
FIG. 6 is a table illustrating Signal to Noise Ratios (SNRs) measured in a mobile electronic device implemented according to an embodiment of the present disclosure.

FIG. 6 is a table illustrating SNRs measured in a mobile electronic device implemented according to an embodiment of the present disclosure. Here, FIG. 6 illustrates results obtained by applying simulation conditions corresponding to Case 3 of FIG. 4.

Referring to FIG. 6, comparing results obtained by using the HAC receiver 133 including the tele-coil with results obtained by using the general receiver 133 with reference to FIG. 6, it may be identified that the mobile electronic device 100 has an SNR higher than that of the mobile electronic device of the related art using the HAC receiver. For example, comparing the SNRs of the magnetic field with respect to the Y-axis, the mobile electronic device of the related art using the HAC receiver has an SNR of 28.28 and the mobile electronic device implemented by using the general receiver 133 has an SNR of 28.88 higher than that of the mobile electronic device of the related art. Furthermore, as noted from FIG. 6, the SNRs for the Y-axis and Z-axis components of the magnetic field are higher than or equal to the SNR of 20 dB which is a requisite for obtaining a T3 rating according to the HAC regulation.

Figure 7:
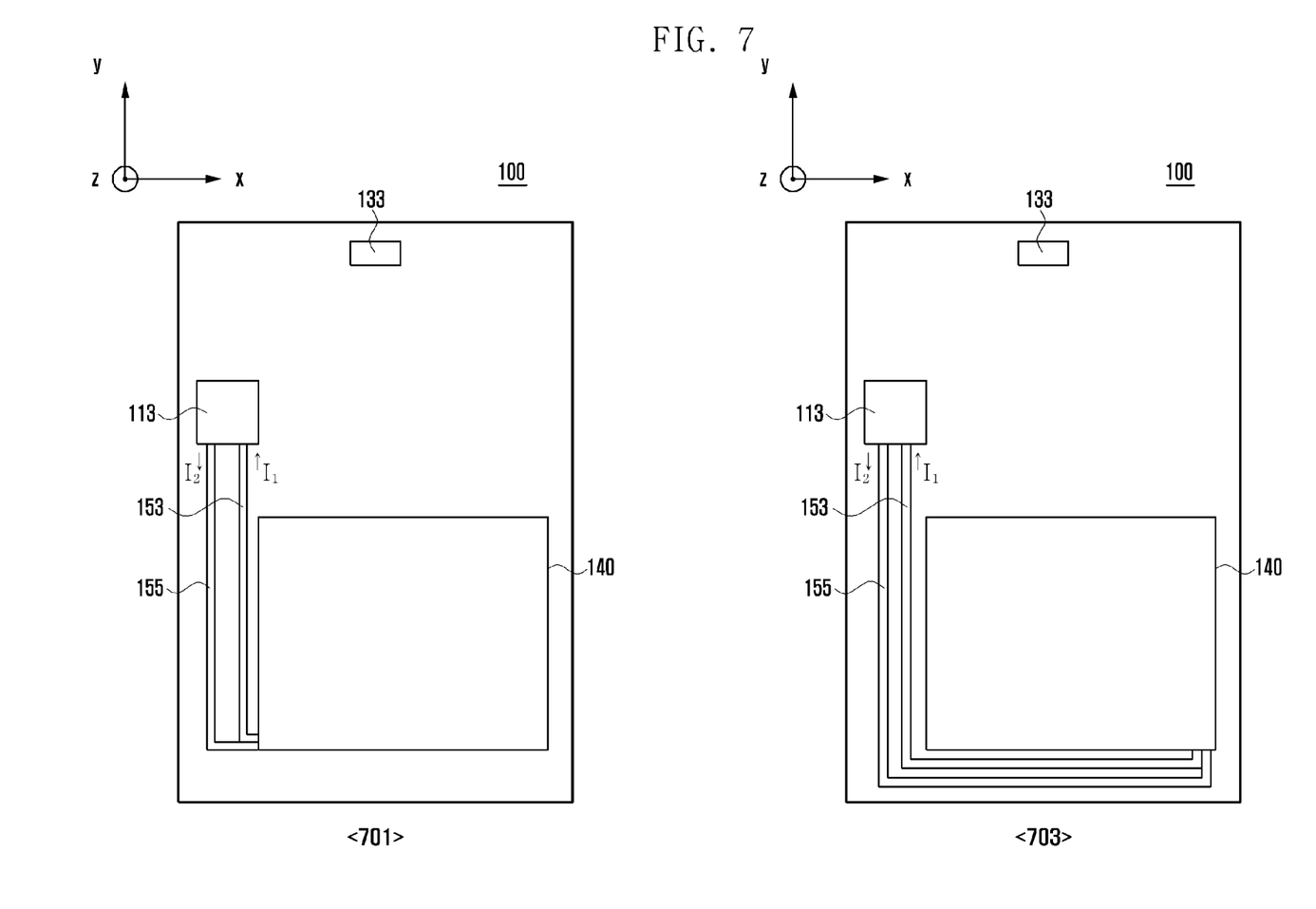
FIG. 7 illustrates rear views of mobile electronic devices for reducing noise received by a receiver according to an embodiment of the present disclosure.

FIG. 7 illustrates rear views of mobile electronic devices for reducing noise received by a receiver according to an embodiment of the present disclosure.

Referring to FIG. 7, in comparison to FIG. 3, the first and second lines 153 and 155 are designed to be in parallel with the X-axis in FIG. 3, but <701> of FIG. 7 illustrates a mobile electronic device 100 in which first and second lines 153 and 155 are designed to be in parallel with a Y-axis. In addition, <703> of FIG. 7 illustrates a mobile electronic device 100 in which among first and second lines 153 and 155, one is designed to be in parallel with a Y-axis and the other is designed to be in parallel with an X-axis. In the case of <701> of FIG. 7, since the first and second lines 153 and 155 are designed to be in parallel with the Y-axis, magnetic field components received by the receiver 133 may be formed in directions of the X-axis and the Z-axis. The lines 153 and 155 illustrated in <701> of FIG. 7 are different from the lines illustrated in <301> of FIG. 3 in that the lines 153 and 155 are designed to be in parallel with the Y-axis, and therefore, a detailed description thereof will be omitted.

In the case of <703> of FIG. 7, magnetic field components received by the receiver 133 may be formed in directions of the X-axis, the Y-axis, and the Z-axis. In <703> of FIG. 7, the magnetic field received by the receiver 133 may be calculated by independently summing up a magnetic field generated by currents flowing through a portion of the first line 153 and a portion of the second line 155 which are parallel with the Y-axis and a magnetic field generated by currents flowing through a portion of the first line 153 and a portion of the second line 155 which are parallel with the X-axis. Accordingly, even in the case of <703> of FIG. 7, line design for reduction of the magnetic field received by the receiver 133 may be implemented by using the simulation results which have been described above with reference to FIGS. 3, 4, and 5.

As described above, the hearing aid compatible mobile electronic device 100 according to the various embodiments of the present disclosure can reduce the noise through the change of the line design to improve the SNR, thereby providing excellent usability.

Meanwhile, the aforementioned mobile electronic device 100 may further include additional modules according to the provided form thereof. For example, the mobile electronic device may further include unmentioned elements, such as a short range communication module for short range communication, an interface for data transmission/reception by a wired communication scheme or a wireless communication scheme of the mobile electronic device 100, an internet communication module for performing an internet function through communication with an internet network, a digital broadcasting module for performing a digital broadcasting reception function and a digital broadcasting reproduction function, and the like. Although all such elements may not be listed since modifications thereof can be diversely made according to a convergence trend of digital devices, elements equivalent to the aforementioned elements may be further included in the above-described device. Furthermore, specific configurations in the mobile electronic device 100 may also be omitted or replaced by other configurations according to the provided form thereof. This will be easily understood by those skilled in the art to which the present disclosure pertains.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A hearing aid compatible mobile electronic device, the electronic device comprising:
   a wireless communication unit comprising a power amplification module;
   a power source configured to transfer a first current to the power amplification module through a sending end thereof and to receive a second current from the power amplification module through a ground terminal thereof;
   a line unit connected between the power amplification module and the power source, and comprising a first line through which the first current flows and a second line through which the second current flows in an opposite direction to the first current, wherein a first magnetic field of the first current is reduced by a second magnetic field of the second current flowing in the opposite direction; and
   a receiver configured to:
      receive the reduced first magnetic field generated by the first current and the second magnetic field generated by the second current, generate a magnetic signal for hearing aid compatibility including a reduced noise component corresponding to the reduced first magnetic field, and convert an electrical voice signal into a voice.

2. The electronic device of claim 1, wherein the power amplification module comprises a Global System for Mobile Communications (GSM) power amplification module.

3. The electronic device of claim 1, wherein the first line and the second line are arranged to be in parallel with each other.

4. The electronic device of claim 1, wherein each of heights of the first line and the second line is adjusted.

5. The electronic device of claim 4, wherein the first line and the second line are disposed at the same height.

6. The electronic device of claim 1, wherein a separation distance between the first line and the second line is adjusted.

7. The electronic device of claim 1, wherein a length difference between the first line and the second line is adjusted.

8. The electronic device of claim 7, wherein the first line and the second line are designed to have the same length.

9. The electronic device of claim 1, wherein a separation distance between the receiver and the first line, and a separation distance between the receiver and the second line are adjusted.

10. The electronic device of claim 1, further comprising:
a controller configured to control the second current while the first current is constant.

11. The electronic device of claim 10, further comprising:
a current adjustment unit,
wherein the controller is configured to control the current adjustment unit to adjust the second current while the first current is constant.

12. The electronic device of claim 11, wherein the current adjustment unit comprises at least one of a current distributor, a buck circuit, and a boost circuit.

* * * * *